G. I. Mix,
Spoon.
№ 18,513          Patented Oct. 27, 1857.
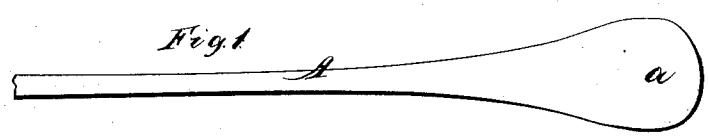
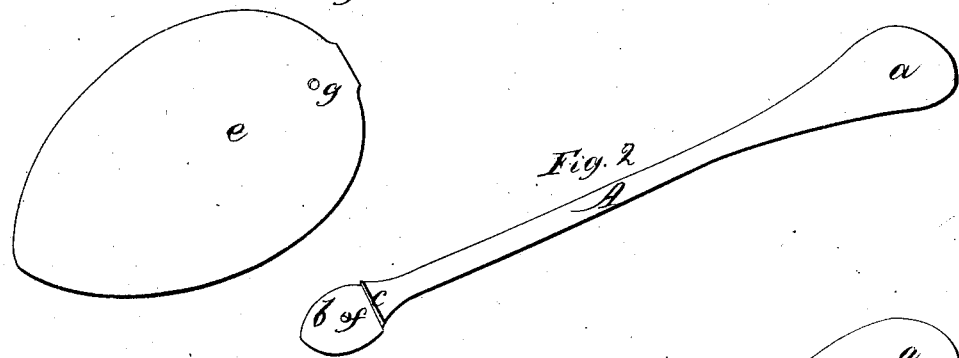
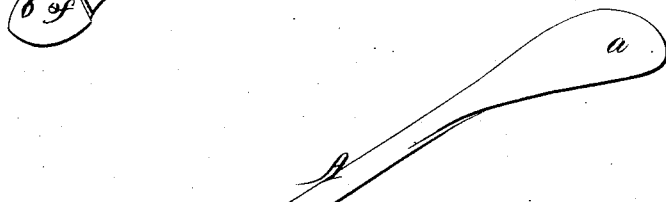
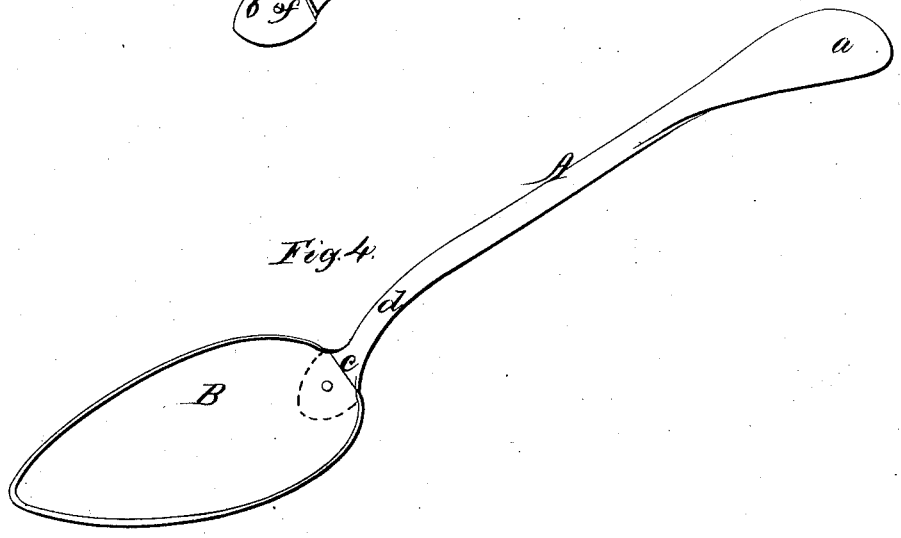

UNITED STATES PATENT OFFICE.

G. I. MIX, OF WALLINGFORD, CONNECTICUT.

MAKING IRON SPOONS.

Specification forming part of Letters Patent No. 18,513, dated October 27, 1857; Reissued August 8, 1871, No. 4,506.

*To all whom it may concern:*

Be it known that I, G. I. Mix, of Wallingford, in the county of New Haven and State of Connecticut, have invented a new and useful Improvement in the Construction of Iron Spoons; and I do hereby declare that the following is a full, clear, and exact description of the same, reference being had to the accompanying drawings, making a part of this specification, in which—

Figure 1 is a detached view of a handle, partially completed. Fig. 2 is a detached view of the same, fully completed. Fig. 3 is a detached view of a blank, of which the bowl is formed. Fig. 4 is a view of a spoon completed.

Similar letters of reference indicate the same parts in the four figures.

The nature of my invention consists in having the rivet or pin which secures the handle and bowl together, formed on the handle at the same time and by the same die which gives form to the handle, and thus instead of having to insert a rivet one is already provided which forms part and parcel of the handle, and is more firm on account of but one end being separated from the metal forming the spoon, this mode of constructing spoons providing an improved article of manufacture, to wit: an iron spoon with the rivet forming part and parcel of the handle.

Irons spoons as at present or hitherto made are an exceedingly rude article, merely forged out and tinned, the marks of the hammer being distinctly visible when finished. My improved spoons are fully equal in appearance to those made of the more expensive metals or compositions.

To enable those skilled in the art to fully understand and construct my invention, I will proceed to describe it.

I construct the handle A of the spoon of a piece of iron wire of the requisite thickness and length. One end of this wire is swaged by means of proper dies or rollers, to form the usual flattened outer end of the handle, as shown at ($a$) in Fig. 1. The opposite or inner end of the handle A is also flattened, as shown at ($b$) in Fig. 2, and is provided with a shoulder ($c$). The inner end of the handle is also curved, as shown at ($d$) in Fig. 4.

The bowl B of the spoon is formed by cutting an oval plate or blank ($e$) Fig. 3 out of a piece of plate iron and then striking (by means of dies) said blank or plate into the usual concave form, as shown in Fig. 4.

The inner end of the handle A, the flattened portion ($b$), has a pin ($f$). and this flattened portion ($b$) is fitted to the inner end of the bowl B, the pin ($f$) passing through a hole ($g$) in the bowl. The pin ($f$) is then riveted and the part ($b$) brazed, soldered or welded to the bowl.

The spoon thus constructed is exceedingly neat, and when tinned or galvanized it forms a spoon fully equal in appearance to any manufactured.

Tinned or galvanized iron spoons are far preferable to German silver and other compositions used for such purposes. German silver soon tarnishes or turns yellow and resembles brass; besides, compositions leave an unpleasant taste in the mouth.

Iron spoons have not been hitherto used for table purposes, for being made by hand and forged they could not, without great expense, be finished neatly. Hence the iron spoons constructed hitherto are intended for kitchen use only; but by my improved construction they will compare favorably with any now manufactured.

I would remark that the pin ($f$) is a part and parcel of the handle, raised on the flattened part ($b$) by means of a hole in the upper die which flattens the inner end of the handle.

What I claim as my invention and desire to secure by Letters Patent, is—

Having the rivet or pin which secures the handle and bowl of the spoon together, formed on the handle at the same time and of the same piece of metal, by the same die which gives form to the handle; whereby an improved article of manufacture is provided, to wit: an iron spoon with the rivet forming part and parcel of the handle, substantially as and for the purposes herein set forth.

G. I. MIX.

Witnesses:
E. J. IVES,
BIRDSEY BRISTEL.